(12) United States Patent
Jones et al.

(10) Patent No.: US 10,322,306 B2
(45) Date of Patent: Jun. 18, 2019

(54) ROTATIONAL ENERGY ABSORBER AND FALL ARREST SYSTEM

(75) Inventors: Karl Jones, Devizes (GB); Owain Jones, Chippenham (GB)

(73) Assignee: Latchways PLC, Devizes (GB)

( * ) Notice: Subject to any disclaimer, the term of this patent is extended or adjusted under 35 U.S.C. 154(b) by 716 days.

(21) Appl. No.: 12/682,753

(22) PCT Filed: Oct. 12, 2007

(86) PCT No.: PCT/GB2007/003885
§ 371 (c)(1),
(2), (4) Date: Jun. 3, 2010

(87) PCT Pub. No.: WO2009/047469
PCT Pub. Date: Apr. 16, 2009

(65) Prior Publication Data
US 2010/0236867 A1  Sep. 23, 2010

(51) Int. Cl.
*A62B 35/04* (2006.01)
*A62B 35/00* (2006.01)
*F16F 7/12* (2006.01)

(52) U.S. Cl.
CPC .......... *A62B 35/04* (2013.01); *A62B 35/0093* (2013.01); *F16F 7/123* (2013.01)

(58) Field of Classification Search
USPC ................ 182/231, 236; 188/373; 242/379.1
See application file for complete search history.

(56) References Cited

U.S. PATENT DOCUMENTS

| 3,561,690 A | * | 2/1971 | Muskat | 242/379.1 |
| 4,511,123 A | * | 4/1985 | Ostrobrod | 254/364 |
| 4,846,313 A | * | 7/1989 | Sharp | 188/187 |
| 5,186,289 A | | 2/1993 | Wolner et al. | |
| 5,351,906 A | | 10/1994 | Feathers | |
| 5,447,280 A | | 9/1995 | Feathers | |
| 5,618,006 A | * | 4/1997 | Sayles | 242/379.1 |
| 5,722,612 A | | 3/1998 | Feathers | |
| 5,829,548 A | * | 11/1998 | Ostrobrod | 182/18 |
| 5,934,597 A | * | 8/1999 | Ludwig | 242/379.1 |

(Continued)

FOREIGN PATENT DOCUMENTS

| EP | 0247818 A2 | 12/1987 |
| GB | 1445480 A | 8/1976 |

(Continued)

OTHER PUBLICATIONS

International Search Report for PCT/GB2007/003885 dated Apr. 7, 2008.

(Continued)

*Primary Examiner* — Alvin C Chin-Shue
(74) *Attorney, Agent, or Firm* — Gordon & Jacobson, P.C.

(57) ABSTRACT

A rotational energy absorber typically for use in a fall arrest system has a coiler, a length of plastically deformable strip and a deformer structure. The plastically deformable strip has a first end attached to the coiler and a second free end and extends past the deformer structure at a position between the first and second ends. Relative rotation of the coiler member and deformer structure causes the strip to be drawn past the deformer structure, plastically deforming the strip and winding the strip coil form about the coiler member.

26 Claims, 5 Drawing Sheets

(56) References Cited

U.S. PATENT DOCUMENTS

| | | | |
|---|---|---|---|
| 6,042,042 A * | 3/2000 | Fujii et al. | 242/379.1 |
| 6,279,682 B1 * | 8/2001 | Feathers | 182/239 |
| 7,281,620 B2 * | 10/2007 | Wolner et al. | 192/223.1 |
| 8,181,744 B2 | 5/2012 | Parker et al. | |
| 2006/0021825 A1 | 2/2006 | An et al. | |
| 2009/0178887 A1 | 7/2009 | Reeves et al. | |

FOREIGN PATENT DOCUMENTS

| | | |
|---|---|---|
| WO | WO0146601 A1 | 6/2001 |
| WO | WO2007057636 A1 | 5/2007 |
| WO | 2008/007119 A1 | 1/2008 |

OTHER PUBLICATIONS

International Search report for PCT/GB2008/003465 dated Sep. 4, 2009.
Written Opinion of the International Search Authority for PCT/GB2007/003885 dated Apr. 13, 2010.
Written Opinion of the International Search Authority for PCT/GB2008/003465 dated Apr. 13, 2010.

* cited by examiner

ROTATIONAL ENERGY ABSORBER AND FALL ARREST SYSTEM

BACKGROUND OF THE INVENTION

1. Field of the Invention

This invention relates to an improved rotational energy absorber and in particular to an improved rotational energy absorber for use in a fall arrest system.

2. State of the Art

Fall arrest systems are used to prevent personnel working at a height from suffering injury or death due to falls. Fall arrest systems are also often referred to as height safety systems or fall prevention systems.

A common type of rotational energy absorber used in fall arrest systems is a friction brake type energy absorber. This generally comprises two circular, or annular, friction pads, held in face to face contact with a preset load between them. When a sufficiently large couple is applied between the two pads, relative rotation of the two pads will take place and the friction between the pads will absorb energy. In a fall arrest system the rotational energy absorber is used to absorb the kinetic energy of a falling user, so slowing and then arresting their fall.

There are a number of problems with such frictional rotational energy absorbers. Firstly, there is the fundamental problem that the applied couple required to start relative rotation of the two pads is larger than the couple required to continue rotation. This is a particular problem in a fall arrest system because there is a maximum safe load which a falling person can be subjected to while their fall is being arrested. The fall arrest system must be arranged so that the load applied to a falling user by the couple required to start relative rotation of the friction pads is not larger than the safe limit, so it follows that the load applied to the falling user by the smaller couple required to continue relative rotation of the friction pads will be less than the safe limit. As a result the rate at which the energy of the fall is absorbed is less than could be achieved if the load applied to the falling user was constant at the safe limit, so that the falling user will fall further before their fall is arrested and the user brought to a stop. The extra distance fallen increases the risk that the falling user will be injured by impact with obstacles, or the ground. Further, the extra distance fallen increases the total amount of energy which must be absorbed, requiring an increase in the energy absorbing capacity of the energy absorber, and thus an undesirable increase in size, weight and cost.

Further, the degree of friction between the two pads is dependent upon the contact load acting between the two pads. As a result, in order to set the couple required to start and continue relative rotation of the pads to a desired value, such frictional energy absorbers require precise setting of the contact load. Further, the mechanism used to set the contact load, generally some form of spring, suffers from the problem of the applied load changing over time due to environmental effects.

Finally, the couples required to start and continue the relative rotation of the pads is highly sensitive to the surface properties of the pads. These properties are subject to the problem of the required couple changing over time due to environmental effects.

SUMMARY OF THE INVENTION

The present invention was made in order to overcome these problems, at least in part.

In a first aspect, the present invention provides a rotational energy absorber comprising:

a coiler member;

an elongate element of a plastically deformable material; and a deformer structure;

the elongate element having a first end attached to the coiler member and a second free end remote from the first end; the elongate element extending past the deformer structure at a position between the first and second ends; relative rotation of the coiler member and deformer structure causing the elongate element to be drawn past the deformer structure, plastically deforming the elongate element and winding the elongate element coil form about the coiler member.

In a first embodiment of the invention, the coiler member may rotate with respect to a relatively fixed deformer structure.

The coiler member may comprise an inner member arranged for relative rotation with respect to an outer member; the outer member comprising the deforming structure. Beneficially, actuation is such that when a couple below a predetermined value is applied to the coiler member, the elongate element is not drawn past the deformer structure and there is no rotation of the coiler, and when a couple above the predetermined value is applied, the elongate member passes the deformer structure and is plastically deformed, so absorbing energy and permitting rotation of the coiler member and the outer member.

In a second aspect, the invention provides a rotational energy absorber comprising an inner member and an outer member arranged for relative rotation and an elongate element of plastically deformable material; the outer member comprising a deforming means; the elongate element having a first end attached to the inner member and a second free end remote from the first end, and passing through the deforming means at a point between the first and second ends; so that when a couple below a predetermined value is applied between the inner member and the outer member the elongate element does not pass through the deforming means and there is no relative rotation of the inner member and the outer member, and when a couple above the predetermined value is applied between the inner member and the outer member the elongate member passes through the deforming means and is plastically deformed, so absorbing energy and permitting relative rotation of the inner member and the outer member.

This provides the advantage that because the predetermined value of the applied couple required to deploy the elongate element is determined by plastic deformation and not friction, the applied couple required to begin deployment of the elongate element and operation of the energy absorber is the same as the applied couple required to continue the deployment and operation. Accordingly, when used in a fall arrest system the deployment of the elongate element can be carried out throughout the operation of the energy absorber at a level of applied couple corresponding to the maximum safe load which can be applied to the user, so minimising the length of the fall before the user fall is arrested.

Further, because the predetermined value of the applied couple required to deploy the elongate element is determined by the plastic deformation, and thus the bulk material properties, of the elongate element and not the surface properties of a component, the energy absorber is less subject to change over time due to environmental effects.

Further, the predetermined value of the applied couple required to deploy the elongate element is determined by the properties of the elongate element and the deforming means and not by any externally applied load. Accordingly, there is no requirement for setting of a precise contact load or any problem of changes in a contact load over time due to environmental effects.

Preferably, a space is defined within which the elongate element is stored, in coil form, after passing through the deformer structure, the space being insufficiently large to contain all of the elongate element, so that the space will become filled with the elongate element and the elongate element will be stopped from passing through the deformer structure before the free end of the elongate element passes through the deforming means.

This provides the advantage that deployment of the elongate element is brought to a stop in a controlled manner before the elongate element is released from the deformer structure.

According to a further aspect, in simplified form, the invention may comprise a rotational energy absorber comprising:

a coiler member;

an elongate element of a plastically deformable material;

the elongate element having a first end attached to the coiler member and a second free end remote from the first end, relative rotation of the coiler member causing the elongate element to be wound coil form about the coiler member, plastically deforming the elongate element, such that following operation of the energy absorber, the elongate element is wound coil form about the coiler member.

Specific embodiments of the invention will now be described, by way of example only, with reference to the accompanying diagrammatic figures.

DETAILED DESCRIPTION OF THE PREFERRED EMBODIMENT

Figure 1:
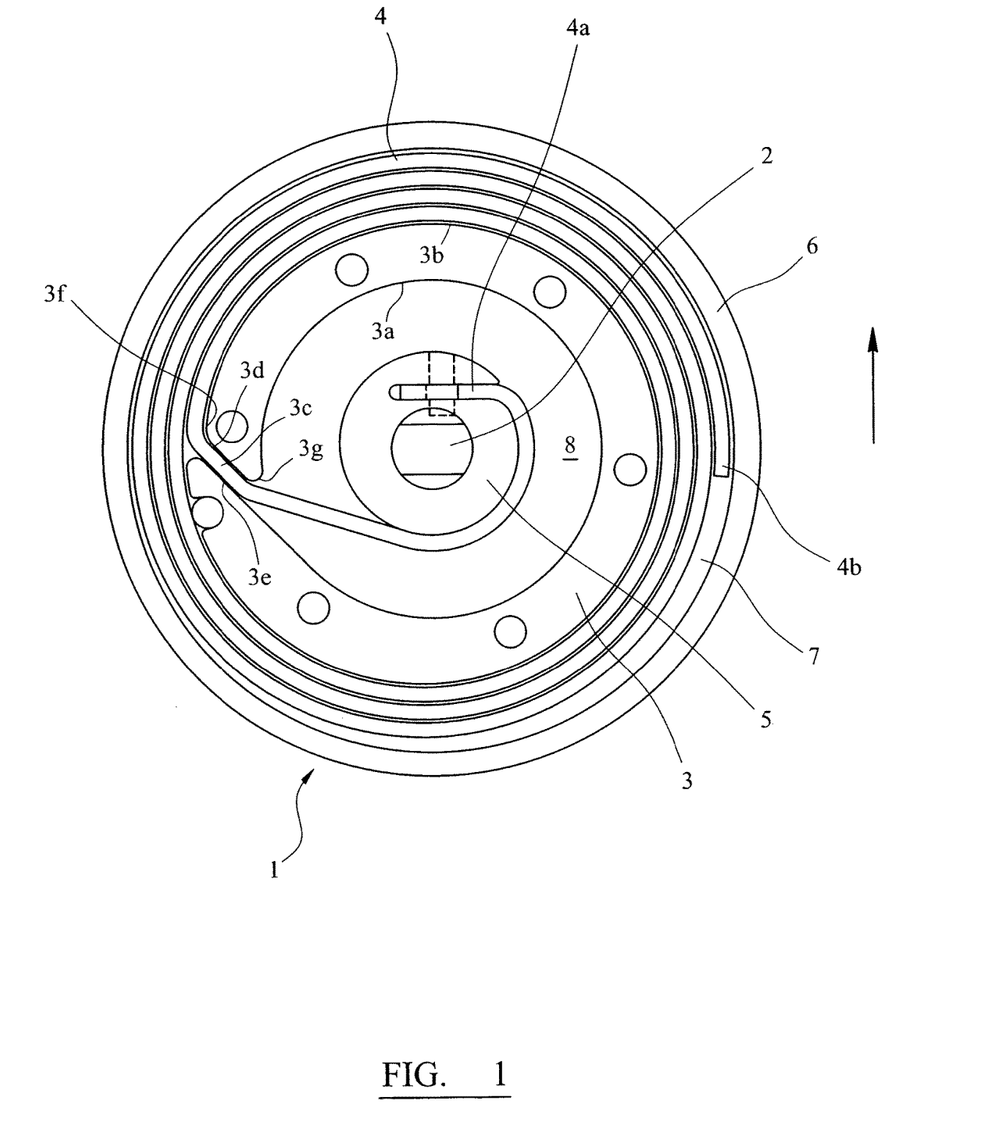
FIG. 1 shows a schematic view of a first rotational energy absorber according to the invention.

A rotational energy absorber 1 according to the invention is shown in plan view in FIG. 1. The energy absorber 1 comprises an axle 2 and a circular annular deformer ring 3 arranged concentrically about the axle 2 and having an inner surface 3a and an outer surface 3b. The energy absorber 1 is arranged to absorb energy in response to relative rotational movement of an axle 2 and a ring 3. In the illustrated embodiment the energy absorber is arranged to absorb energy in response to anti-clockwise rotation of the axle 2 relative to the ring 3. However, it would be possible to arrange the energy absorber 1 to absorb energy in response to clockwise rotation of the axle 2 relative to the ring 3 by forming the energy absorber 1 as a mirror image of the illustrated embodiment.

The energy absorber 1 further includes a stainless steel strip 4 having a constant thickness and width along its entire length. In operation, the energy absorber 1 absorbs energy by plastic deformation of the stainless steel strip 4.

A coiler member 5 is mounted on the axle 2 so that the coiler 5 rotates with the axle 2 relative to the ring 3. An annular space 8 is defined between the coiler 5 and the inner surface 3a of the ring 3. The ring 3 has a deformer slot 3c passing through the ring 3 and oriented tangentially to the inner surface 3a of the ring 3. The slot 3c is slightly wider than the thickness of the strip 4. The slot 3e has a flat clockwise face 3d and a parallel flat anticlockwise face 3e, and the anticlockwise face 3e of the slot 3 is tangential to the inner surface 3a of the ring 3. The slot 3c has a curved entry surface 3f where the clockwise surface 3d of the slot 3e contacts the outer surface 3b of the ring 3 and a curved exit surface 3g where the clockwise surface 3d of the slot 3c contacts the inner surface 3a of the ring 3. The curved entry surface 3f and the curved exit surface 3g are separated by the flat clockwise face 3d.

The strip 4 has a first end 4a secured to the coiler 5 and a free end 4b. The strip 4 passes through the slot 3e, and rest of the strip, ending in the free end 4c, is coiled around the outer surface 3b of the ring 3. An outer circular cover 6 is provided concentrically about the axle 2 and ring 3 so that an annular strip storage channel 7 is formed between the outer surface 3b of the ring 3 and the cover 6. The cover 6 does not have any direct effect on the operation of the energy absorber 1, but provides protection against environmental effects such as weathering or dust.

In operation of the energy absorber 1, when the couple on the axle 2 relative to the ring 3 reaches or exceeds a predetermined deployment value the axle 2 and coiler 5 will rotate relative to the ring 3. This relative rotation will wind the stainless steel strip 4 around the wheel 5 and pull the stainless steel strip 4 coiled in the annular strip storage channel 7 through the deformer slot 3c into the annular space 8. As the strip 4 passes through the slot 3 the strip 4 is plastically deformed and so absorbs energy.

As the strip 4 passes through the slot 3b, the strip 4 is plastically deformed for a first time as the strip 4 is bent around the curved entry surface 3f, absorbing energy. The strip 4 is then plastically deformed for a second time as it is bent around the curved exit surface 3g, absorbing more energy. The strip 4 is further deformed, absorbing more energy, as the strip 4 is wound around the coiler 5, but this is a relatively small effect compared to the deformations and energy absorption as the strip 4 passes through the slot 3c.

In use, when the energy absorber 1 is subject to a couple between the axle 2 and the ring 3 below a predetermined deployment couple the strip 4 does not deform or pass through the slot 3e so that there is no relative rotation of the axle 2 and the ring 3 and the energy absorber 1 essentially behaves as a rigid body. When the energy absorber 1 is subject to a couple at or above the predetermined deployment couple the strip 4 deforms and passes through the deformer slot 3c, so absorbing energy and allowing relative rotation of the coiler 5 (mounted on axle 2) and the ring 3. If the couple drops below the predetermined deployment couple the strip 4 will stop deforming and passing through the slot 3c and the relative rotation of the axle 2 and the ring 3 will stop.

If the energy absorber 1 remained subject to an applied couple greater than the predetermined deployment couple the entire length of the strip 4 would pass through the slot 3c and when the free end 4b of the strip 4 passed through the slot 3c the axle 2 (and coiler 5) would be released to rotate freely relative to the ring 3 without any energy being absorbed. In order to prevent this, the annular space 8 defined between the coiler 5 and the inner surface 3a of the ring 3 is arranged to be too small to contain the full length of the strip 4 when the strip 4 is wound around the coiler 5.

As a result, as deployment of the strip 4 continues and the strip 4 passes through the slot 3c into the annular space 8 and is wound around the wheel 5, the strip 4 eventually fills the annular space 8 so that the different coils of the strip 4 wound around the coiler 5 are brought into contact and compressed together between the coiler 5 and the inner surface 3a of the ring 3. This contact and compression results in friction between the different coils of the strip 4 and the wheel 5 and inner surface 3a of the ring 3, increasing the applied couple required to continue deployment of the strip 4. This contact and compression of the strip 4 increases as more of the strip 4 passes through the slot 3c and into the annular space 8 so that the amount of friction and the required couple also increase, and as a result the deployment of the strip 4 and the relative rotation of the axle 2 and the ring 3 will be stopped before the free end 4b of the strip 4 passes through the slot 3c.

Thus, the total amount of energy absorbed by the energy absorber 1 is controlled by the size of the annular space 8 and length of the strip 4 which can fit into the annular space 8.

The deployment couple is determined by the resistance to plastic deformation of the strip 4 and not by frictional forces. As a result, the deployment couple required to start relative rotation of the axle 2 and the ring 3 and the deployment couple required to continue relative rotation of the axle 2 and the ring 3 are the same. In order to reduce frictional forces affecting the deployment load as far as possible, and so keep the deployment couple required to start and to continue deployment of the strip 4 constant the strip 4 is coated with surface layer of friction reducing material.

The deployment couple which must be applied between the axle 2 and the ring 3 in order to deform the strip 4 so that the strip 4 begins to pass through the slot 3c can be set to any desired value by adjusting the material, width and thickness of the strip 4 and the shapes of the entry surface 3f and the exit surface 3g.

Figure 2:
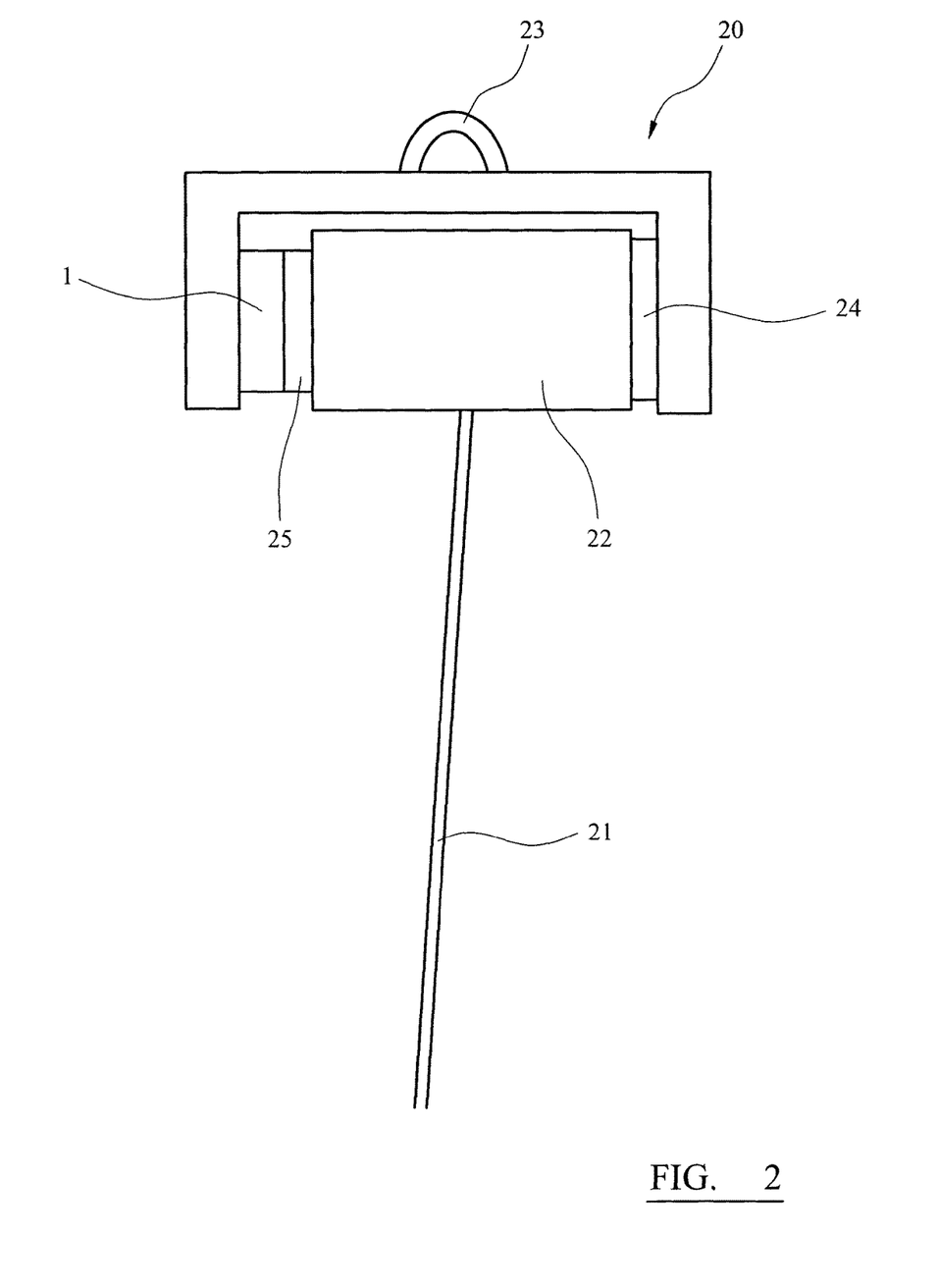
FIG. 2 shows a schematic view of a fall arrest system incorporating the energy absorber of FIG. 1.

An example of a fall arrest system 20 incorporating the energy absorber 1 is shown in FIG. 2. The fall arrest device 20 comprises a length of safety line 21 wound on a drum 22. The drum 22 is connected to a respooling mechanism 24 which maintains a rewinding torque on the drum 22 which acts to rewind any deployed length of safety line onto the drum 22. Typically the respooling mechanism 24 is a clockspring type device. An attachment point 23 is used to connect the device 20 to a fixed supporting structure (not shown). The drum 22 is also connected through a speed sensitive clutch 25 to the energy absorber 1.

In use, a user is attached to the free end of the safety line 21 by personal safety equipment, such as a safety harness. During normal movement of the user, the safety line 21 is wound out from the drum 22 to follow the movement of the user or any excess safety line 21 is wound back onto the drum 21 by the respooling mechanism 24. The speed sensitive clutch 25 is set not to respond to the slow rotation of the drum 22 encountered during this normal movement of the user.

If the user falls, the safety line 21 is unwound rapidly from the drum 22, resulting in rapidly accelerating rotation of the drum 22. When the speed of rotation of the drum 22 reaches the response speed of the speed sensitive clutch 25 the clutch 25 engages the drum 22 to the energy absorber 1. The load of the falling user is then applied to the energy absorber 1 as a couple and the energy absorber 1 responds by deploying and absorbing energy until the fall is arrested.

In will be understood that if the strip 4 was entirely pulled through the slot 3e in this example the user would then suffer an unconstrained fall, and it is for this reason that it is important to ensure that deployment of the strip 4 is stopped before the free end 4b of the strip 4 passes through the slot 3c.

The arrangement shown in FIG. 1 having the outer circular cover 6 defining an annular storage channel 7 for the coiled strip 4 is advantageous in order to provide a compact circular profile for the energy absorber 1, which is particularly advantageous when the energy absorber 1 is used in a fall arrest device 20 of the type shown in FIG. 2. However, as explained above this is not essential.

Also, in the embodiment described the coiler member 5 is rotated whilst the deformer ring 3 remains stationary. It should be appreciated that in an alternative embodiment the deformer ring may be rotated with respect to a stationary coiler 5 and a similar effect would be achieved.

Figure 3:
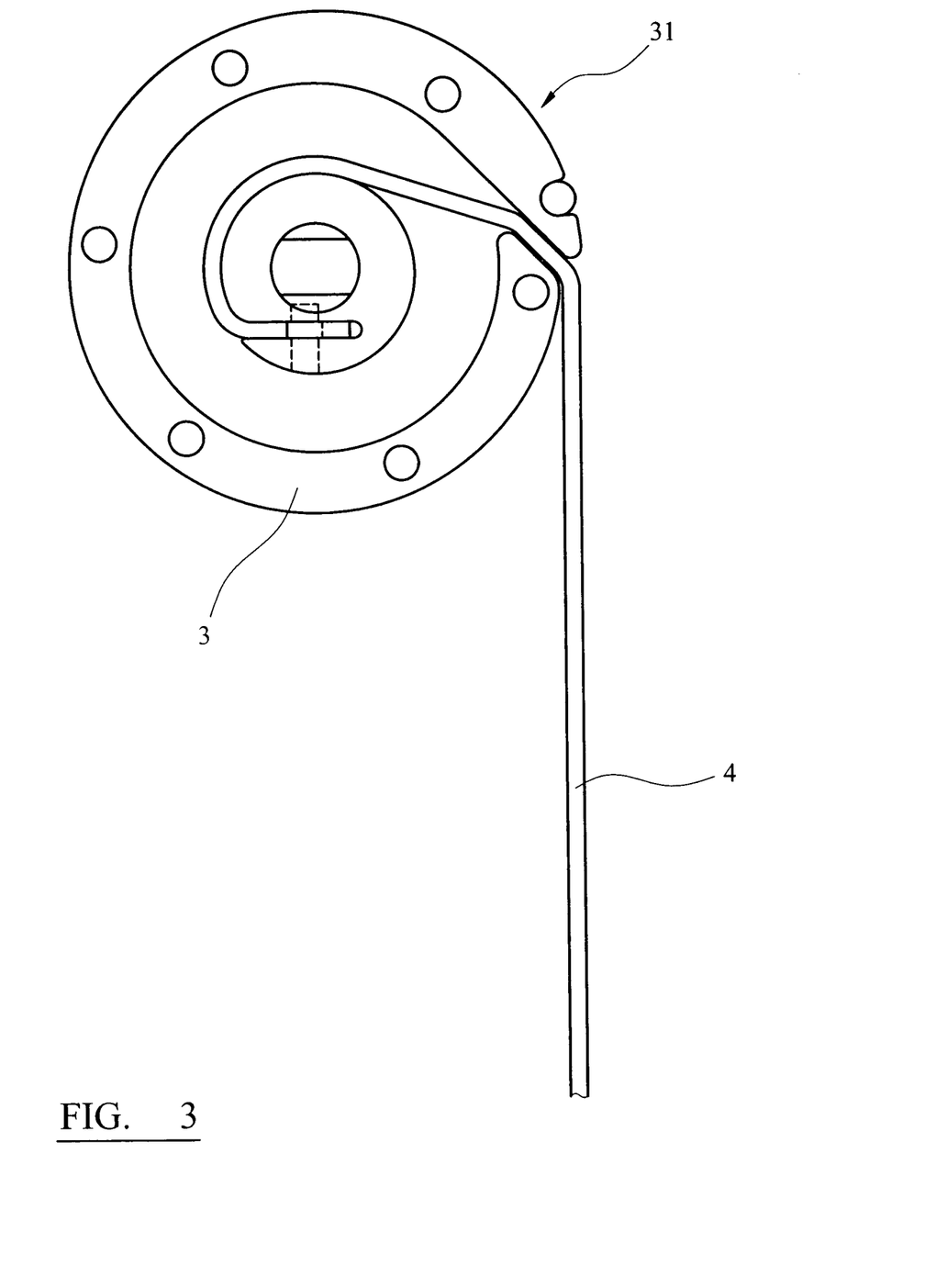
FIG. 3 shows a schematic view of a second energy absorber according to the invention.

An alternative design of energy absorber 31 is shown in FIG. 3. The energy absorber 31 is substantially the same as the energy absorber 1 with the exception that the circular cover is omitted and the steel strip 4 is stored as a straight length instead of being coiled around the ring 3.

Other forms of store for the stainless steel strip 4 could be used. For example, the strip 4 could be formed into a coil adjacent to, instead of surrounding, the ring 3.

In the energy absorbers of FIGS. 1 and 3 the ring 3 is substantially continuous, being broken only by the slot 3c. This is not essential. The deformer simply provides a defined tortuous path along which the strip is drawn prior to being wound on a coiler member.

Figure 4:
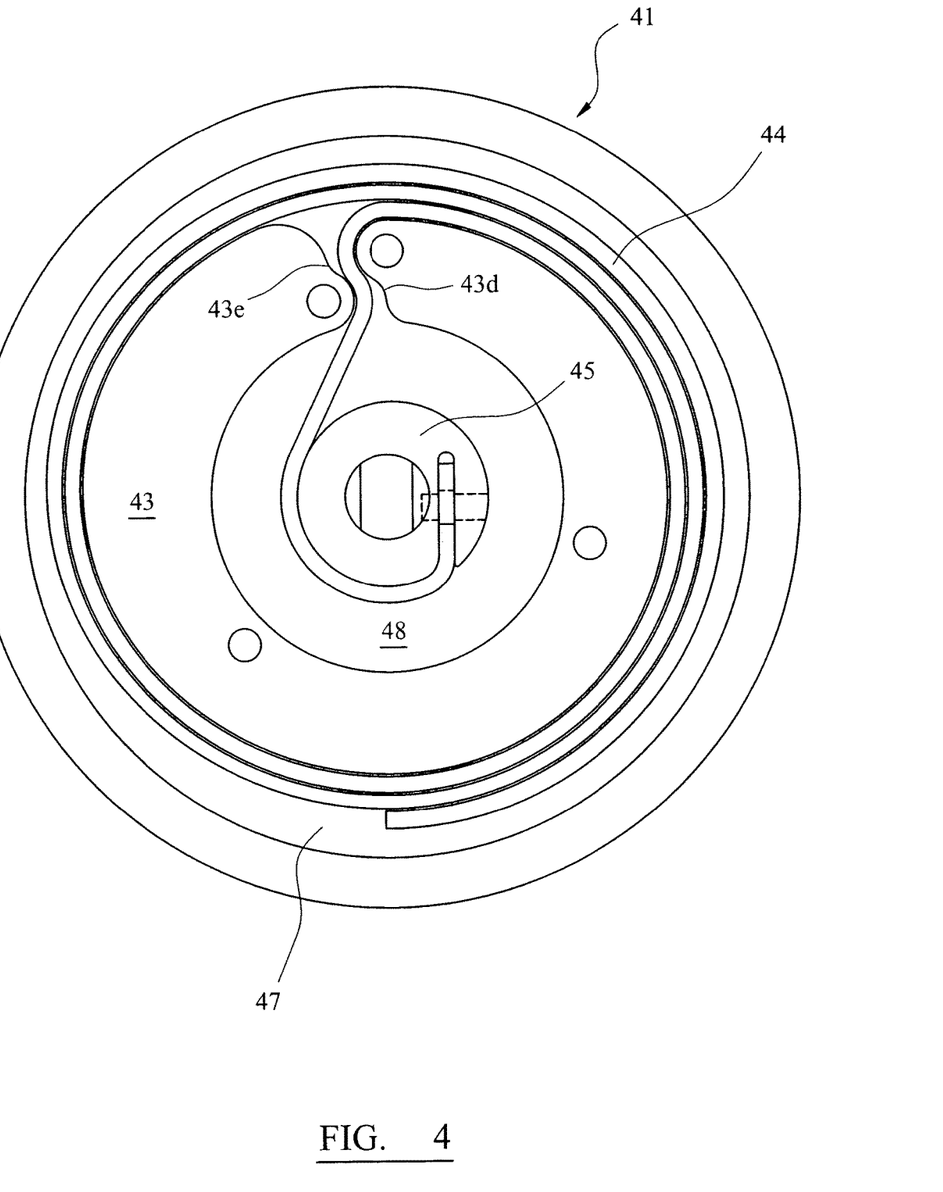
FIG. 4 shows a schematic view of a third energy absorber according to the invention in an initial condition.
Figure 5:
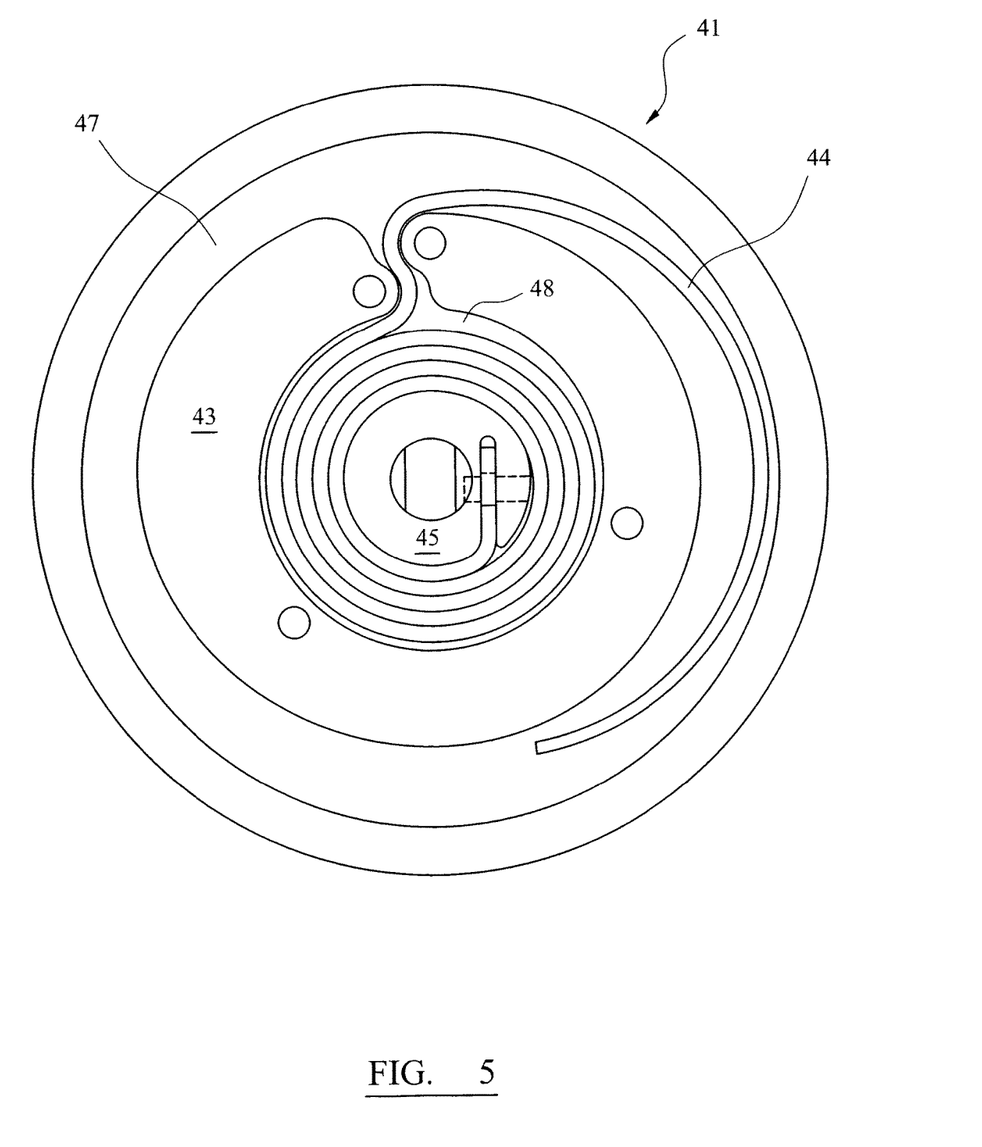
FIG. 5 shows a schematic view of a the energy absorber of FIG. 4 in a subsequent condition.

An alternative design of energy absorber 41 is shown in FIGS. 4 and 5. The energy absorber 41 is substantially the same as the energy absorber 1 except that the deformer slot 3c is formed having opposed curved cam surface portions 43d 43e defining a serpentine draw through path for the strip 44. The use of curved deformer surfaces in the embodiments of FIGS. 1, 3 and 4 provides even plastic deformation rather than high friction spikes that would result from sharp edges.

In FIG. 4 the outer strip storage annular space 47 is shown containing the majority of the strip 44, prior to deployment. In FIG. 5 the strip is shown following deployment, wound on the coiler member 45 and filling the annular space 48 between the coiler member 45 and the deformer ring 43.

In certain embodiments, the annular ring 3 may be replaced by a plurality of spaced apart guide pegs or posts and a deformer structure having the required deformer profile. The deformer structure may in certain embodiments be a curved peg or post. Although pegs or posts do not provide continuous inner and outer surfaces the spaced apart inner and outer surfaces of the pegs and deforming structure are able to control the movement of the strip 4 similarly to the inner surface 3a and outer surface 3b of the ring 3.

In the described embodiments the stainless steel strip has a constant width and thickness. This is usually preferred so that the deployment couple is constant along the length of the strip, which is generally advantageous in fall arrest devices, as explained above. However, this is not essential, and if it was desired to have a changing deployment couple in a particular application the width, thickness or both of the strip 4 could be varied.

Further, it is not essential to use a stainless steel strip. Other shapes could be used, for example wires or rods. Other plastically deformable materials could also be used, although stainless steel is usually preferred because of its resistance to weathering and predicable, well understood properties.

The slot and curved surface arrangement used to plastically deform the strip in the disclosed embodiments is simple and convenient, but not essential. Other deforming mechanisms could be used, for example deforming pins or rollers. The number of times the strip is plastically deformed as it passes through the deforming mechanism can also be changed, but if the strip is repeatedly plastically deformed there is a risk of stress failure.

The features of the different embodiments of the invention can be exchanged or combined if desired.

The above described embodiments are examples only and are not exhaustive.

The invention claimed is:

1. A safety device for use in a fall arrest system, comprising:
   a rotatable drum supporting a safety line wound on the drum, wherein the drum is constructed to rotate in response to deployment of the safety line from the drum;
   a speed responsive clutch connected to the drum, the clutch being responsive to the rotational speed of the drum; and
   a rotational energy absorber operatively coupled to the clutch, the energy absorber including a coiler member, a deforming structure, and a plastically deformable element, the plastically deformable element having a first end coupled to the coiler member, a second free end remote from the first end, and an intermediate portion between the first and second ends positioned through the deforming structure;
   wherein the clutch is constructed to couple the rotatable drum to the rotational energy absorber in a first configuration when the rotational speed of the drum is equal to or exceeds a predetermined speed, and is constructed to not couple the drum to the rotational energy absorber in a second configuration when the rotational speed of the drum is less than the predetermined speed, and
   wherein in the first configuration, relative rotation of the coiler member and the deforming structure causes the deformable element to plastically deform by being drawn through the deforming structure to absorb energy.

2. A safety device according to claim 1, wherein:
   the deformable element is not drawn through the deforming structure and the coiler does not rotate when a torque below a predetermined value is applied to the coiler member, and when a torque above the predetermined value is applied to the coiler member, the deformable member passes through the deforming structure, is plastically deformed, absorbs energy, and permits rotation of the coiler member and the deforming structure.

3. A safety device according to claim 1, wherein:
   the defines space about the coiler member which is sufficient to permit only a proportion of the deformable element to be wound on the coiler member.

4. A safety device according to claim 1, wherein:
   the deformable element is an elongate element, and wherein the coiler member and the deforming structure define a space between them in which the elongate element is stored after passing through the deforming structure, the space being insufficiently large to store all of the elongate element, whereby the space is filled with the elongate element and the elongate element is stopped from passing through the deforming structure before the free end of the elongate element passes through the deforming structure.

5. A safety device according to claim 4, wherein:
   when the elongate element has been stopped from passing through the deforming structure by the space being filled by the elongate element, the energy absorber will support a couple of at least twice a predetermined value.

6. A safety device according to claim 1, wherein:
   the deformable element is an elongate element having a constant cross section.

7. A safety device according to claim 1, wherein:
   the deformable element is an elongate element formed as a strip.

8. A safety device according to claim 7, wherein:
   the elongate element is a stainless steel strip.

9. A safety device according to claim 1, wherein:
   the deforming structure includes one or more curved deformation surfaces.

10. A safety device according to claim 9, wherein:
    the deformable element is an elongate element and the one or more curved deformation surfaces include two opposed surfaces which define a slot for receiving the elongate element such that the elongate element contacts the two opposed surfaces as it is drawn through the slot to effect plastic deformation thereof.

11. A safety device according to claim 1, wherein:
    at least one of the deforming structure and the coiler member defines a serpentine path for the elongate element to be drawn through to effect plastic deformation thereof.

12. A safety device according to claim 1, wherein:
    the deformable element is formed into a coiled store prior to being wound in the coil form about the coiler member.

13. A safety device according to claim 12, wherein:
    the coiled store surrounds but is spaced apart from the coiler member.

14. A safety device according to claim 1, wherein:
    the deformable element is formed into a coiled store about the deforming structure prior being drawn through the deforming structure.

15. A safety device according to claim 12, further comprising:
    a cover surrounding the coiled store.

16. The safety device according to claim 1, wherein an aperture is formed in the deforming structure, the aperture constructed to plastically deform the deformable element while the deformable element passes through the aperture.

17. The safety device according to claim 16, wherein the aperture is a slot having two opposing sides in contact with the deformable element.

18. The safety device according to claim 17, wherein the deformable structure is formed as a discontinuous ring surrounding the coiler member defining a generally annular space between the coiler member and the ring, and wherein the ring has two opposed deformation surfaces which define the slot.

19. The safety device according to claim 18, wherein the slot in the ring is oriented tangentially to an inner surface of the ring.

20. The safety device according to claim 1, wherein the coiler member and the deforming structure are constructed to rotate relative to one another when a couple transferred by the clutch between the coiler member and the deforming structure is equal to a predetermined deployment couple that is based on the resistance to plastic deformation of the deformable element.

21. The safety device according to claim 20, wherein the coiler member and the deforming structure are constructed not to rotate relative to one another when the couple transferred by the clutch between the coiler member and the deforming structure is less than the deployment couple.

22. The safety device according to claim 1, wherein the clutch is constructed to apply a load from the drum to the absorber as a couple.

23. The device according to claim 1, wherein the rotational energy absorber is different from the speed responsive clutch.

24. A safety device for use in a fall arrest system, comprising:
   a rotatable drum supporting a safety line wound on the drum, wherein the drum is constructed to rotate in response to deployment of the safety line from the drum;
   a speed responsive clutch connected to the drum, the clutch being responsive to the rotational speed of the drum; and
   a rotational energy absorber operably coupled to the clutch, the energy absorber including a coiler member, a deforming structure, and a plastically deformable element, the plastically deformable element having a first end coupled to the coiler member, a second free end remote from the first end, and an intermediate portion between the first and second ends positioned through the deforming structure;
   wherein the clutch is constructed to couple the rotatable drum to the rotational energy absorber in a first configuration when the rotational speed of the drum is equal to or exceeds a predetermined speed, and is constructed to not couple the drum to the rotational energy absorber in a second configuration when the rotational speed of the drum is less than the predetermined speed, and
   wherein in the first configuration, the clutch is constructed to drive relative rotation of the coiler member and the deforming structure to plastically deform the deformable element by being drawn through the deforming structure to absorb energy, and
   wherein the coiler member and the deforming structure are constructed to begin to rotate relative to one another when a couple transferred by the clutch between the coiler member and the deforming structure is at least equal to a predetermined deployment couple that is based on the resistance to plastic deformation of the deformable element, and wherein the couple required to continue relative rotation between the coiler member and the deforming structure is equal to the predetermined deployment couple.

25. The safety device according to claim 24, wherein the coiler member and the deforming structure are constructed not to rotate relative to one another when the couple transferred by the clutch between the coiler member and the deforming structure is less than the deployment couple.

26. The device according to claim 24, wherein the predetermined couple corresponds to a maximum safe load which can be applied to the user.

* * * * *